United States Patent [19]

Stulpin et al.

[11] Patent Number: 5,458,682
[45] Date of Patent: Oct. 17, 1995

[54] GLASS CONTAINER COATING APPARATUS WITH STAGGERED ROWS OF COATING ROLLERS

[75] Inventors: Robert W. Stulpin, Simsbury; Richard A. Telman, Litchfield, both of Conn.

[73] Assignee: Advanced Glass Treatment Systems, Simsbury, Conn.

[21] Appl. No.: 170,553

[22] Filed: Dec. 20, 1993

Related U.S. Application Data

[63] Continuation-in-part of Ser. No. 14,542, Feb. 8, 1993, abandoned.

[51] Int. Cl.⁶ .................................................... B05C 1/02
[52] U.S. Cl. ........................... 118/219; 118/221; 118/258
[58] Field of Search .................................. 118/239, 257, 118/221, 219, 258

[56] References Cited

U.S. PATENT DOCUMENTS

| | | |
|---|---|---|
| Re. 28,947 | 8/1976 | Bowman . |
| 506,184 | 10/1893 | McDonald . |
| 573,667 | 12/1896 | Kohl et al. . |
| 726,473 | 4/1903 | Smith ................................ 118/221 |
| 2,015,669 | 10/1935 | Gravely et al. . |
| 2,072,663 | 3/1937 | Bedford .............................. 118/258 |
| 2,210,187 | 8/1940 | Ross . |
| 2,224,496 | 12/1940 | Wild et al. . |
| 2,367,722 | 1/1945 | Guthrie . |
| 2,388,911 | 11/1945 | Fink .................................... 118/239 |
| 2,480,567 | 8/1949 | Gaither ............................... 118/221 |
| 2,572,513 | 10/1951 | Paul .................................... 118/223 |
| 2,600,747 | 6/1952 | Faust .................................. 118/221 |
| 2,721,534 | 10/1955 | Lucas .................................. 118/258 |
| 2,868,162 | 1/1959 | Knain . |
| 2,944,510 | 7/1960 | Jeremiah . |
| 3,160,092 | 12/1964 | Eisen . |
| 3,221,643 | 12/1965 | Rudolph et al. . |
| 3,241,518 | 3/1966 | Johnson . |
| 3,251,707 | 5/1966 | Blank et al. . |
| 3,261,289 | 7/1966 | Cash et al. . |
| 3,353,514 | 11/1967 | Lyle . |
| 3,479,208 | 11/1969 | Dubble et al. . |
| 3,677,801 | 7/1972 | Hardy . |
| 3,690,296 | 9/1972 | Townsend . |
| 3,695,223 | 10/1972 | Dunham et al. . |
| 3,734,765 | 5/1973 | Russell et al. . |
| 3,741,744 | 6/1973 | Bowman . |
| 3,765,856 | 10/1973 | Bowman . |
| 3,850,096 | 11/1974 | Taniguchi . |
| 3,902,453 | 9/1975 | Frische . |
| 3,934,993 | 1/1976 | Bowman et al. . |
| 3,950,199 | 4/1976 | Lucas . |
| 3,960,073 | 6/1976 | Rush . |
| 4,111,150 | 9/1978 | Donley et al. . |
| 4,138,965 | 2/1979 | Riese et al. . |
| 4,201,562 | 5/1980 | Hofmann et al. . |
| 4,210,684 | 7/1980 | Shriver . |
| 4,287,849 | 9/1981 | Walchhuetter ................. 118/221 |
| 4,308,818 | 1/1982 | Abe et al. . |
| 4,370,943 | 2/1983 | Watanabe et al. . |
| 4,371,387 | 2/1983 | Scholes . |
| 4,413,587 | 11/1983 | Cook ................................. 118/239 |
| 4,587,925 | 5/1986 | Cook ................................. 118/239 |
| 4,640,406 | 2/1987 | Willison . |
| 4,677,934 | 7/1987 | Maeda ............................... 118/239 |
| 4,962,721 | 10/1990 | Peek . |

FOREIGN PATENT DOCUMENTS

| | | | |
|---|---|---|---|
| 0350117 | 1/1990 | European Pat. Off. ............ 118/239 |
| 1108173 | 6/1961 | Germany .......................... 118/221 |
| 27858 | 7/1981 | Japan ................................. 118/257 |

Primary Examiner—W. Gary Jones
Assistant Examiner—John M. Hoffmann
Attorney, Agent, or Firm—Fishman, Dionne & Cantor

[57] ABSTRACT

Apparatus is presented for applying a coating of liquid material to a glass container and curing the coating to enhance the strength of the glass container. The apparatus includes an array of rollers in staggered alignment for coating the bottom of the container, along with differential speed belts for coating the side wall of the container and separate curing stations for curing the bottom coating and the side wall coating.

71 Claims, 3 Drawing Sheets

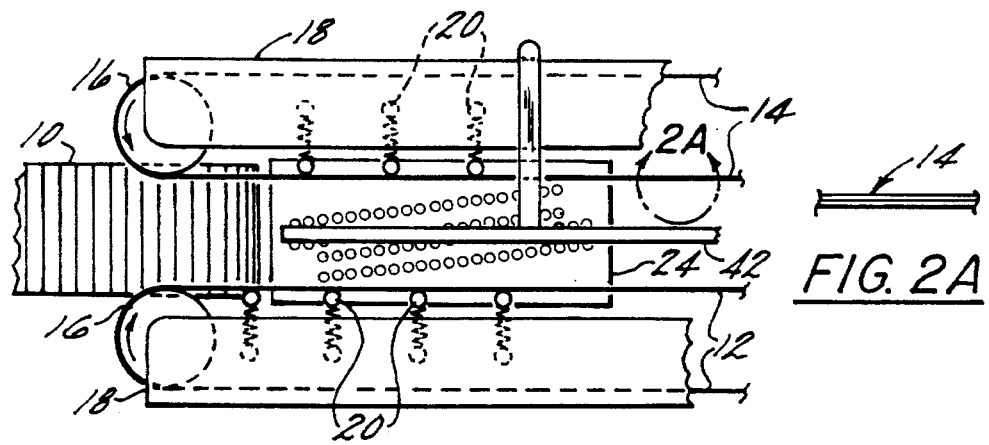
FIG. 2A
FIG. 2
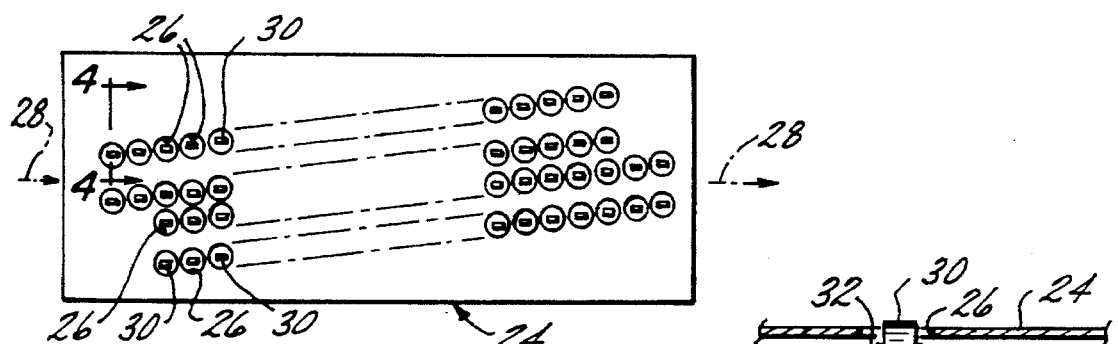
FIG. 3
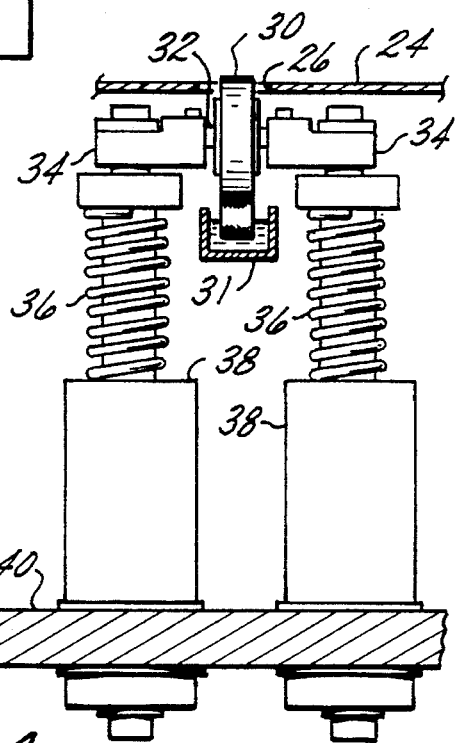
FIG. 4

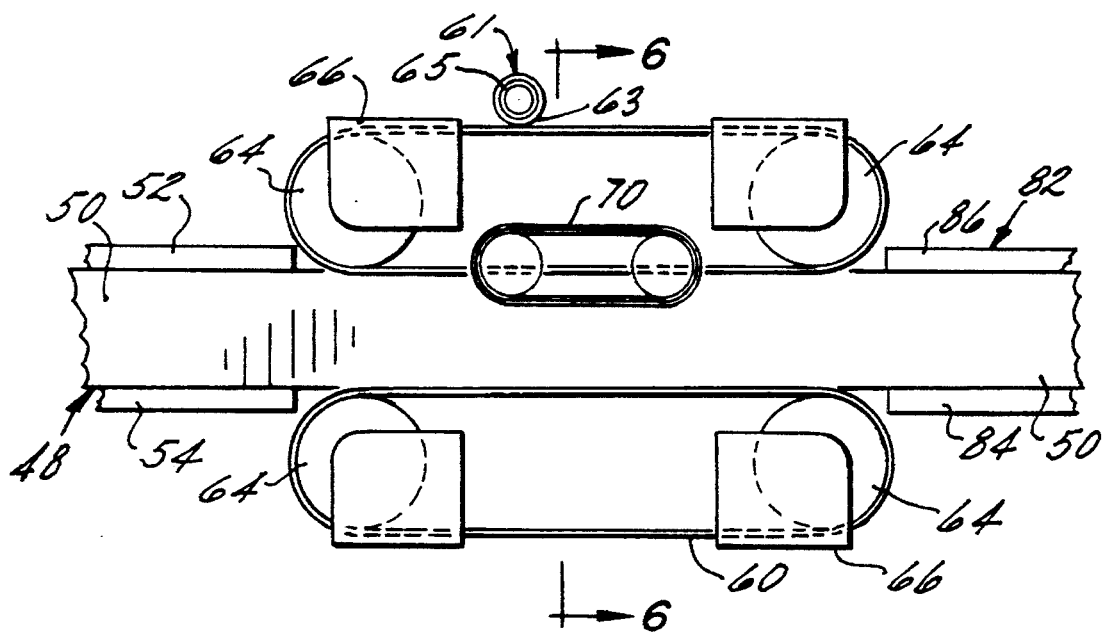
FIG. 5
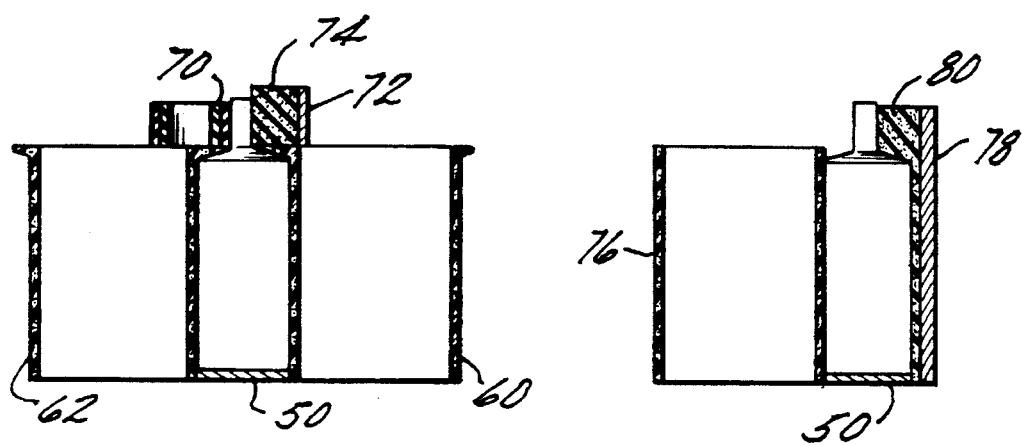
FIG. 6
FIG. 7

GLASS CONTAINER COATING APPARATUS WITH STAGGERED ROWS OF COATING ROLLERS

CROSS-REFERENCE TO RELATED APPLICATION

This application is a continuation-in-part of U.S. application Ser. No. 014,542, filed Feb. 9, 1993.

BACKGROUND OF THE INVENTION

This invention relates to the field of bottle coating apparatus. More particularly, this invention relates to a machine and system for applying a UV curable strength enhancing coating to the bottoms and side walls of bottles and curing the coatings thus applied.

In the past several years there has been a significant and growing interest in increasing the strength of glass containers, especially bottles and jars, to improve pressure resistance and impact strength. This interest is particularly focussed on bottles intended to hold carbonated beverages, although bottles for noncarbonated products are also of interest. Increasing the pressure resistance strength and impact strength reduces the incidence of bottles bursting, whether under static load or impact load and/or it enables glass container manufacturers to save on material by achieving desired strength levels with thinner bottles.

In recent years several patents have been issued on coating materials for strength enhancement of glass containers. See, for example, U.S. Pat. No. 5,112,658 to Skutnik, and U.S. Pat. 4,891,241 to Hashimoto et al, the contents of which are incorporated herein. The coating materials of those patents are intended to be applied to glass containers as a thin liquid coating which is then cured by UV irradiation to increase the strength of the bottle, per se. This is to be distinguished from the field of burst containment coating where a relatively thick coating of material is applied to glass bottles to physically contain, i.e., prevent flying fragmentation, of the glass upon explosive rupture of the bottle. The coatings of the type of the Skutnik and Hashimoto patents increase the strength of the glass; burst containment coatings prevent the glass from flying about but do not increase the strength of the glass.

Strength enhancement coatings such as disclosed in the Skutnik and Hashimoto patents can be applied to the glass containers in a variety of ways, such as, e.g., by dip coating or spraying. However, dip coating and spraying each presents processing and/or environmental problems that are to be avoided if possible. Thus, the need exists for an effective, economical and practicable way to apply such coatings to glass containers and cure the coatings to produce strength enhanced glass containers on a commercial basis.

Coating and curing the bottom of the container presents different and more difficult problems from those encountered in coating the sides. Nevertheless, an effective way must be found to coat and cure the bottom of the container. Otherwise the strength of the bottom is not enhanced, and the objective of strength enhancement is seriously compromised.

SUMMARY OF THE INVENTION

While it will be understood that the apparatus of the present invention is suitable for coating and curing to enhance the strength of any glass container, the invention will be described in connection with apparatus for coating and curing bottles, such as beer or soda bottles. Also, the invention will be described with reference to coating materials such as in the above referenced Skutnik and Hashimoto et al patents, but it is not limited to such coatings.

In accordance with the present invention, apparatus is presented which applies a strength enhancing coating material to the outer bottom and outer side wall of a glass bottle and cures the coatings in series of discrete and sequentially related operations. The bottom of the bottle is first coated and cured; and then the side wall of the container is coated and cured. The apparatus of the present invention effects both coating and curing operations in a sequential continuous operation. The bottom coating apparatus is an especially important and novel part of the apparatus.

The bottom coating is accomplished at a bottom coating station by means of a perforated plate with coating rollers located at openings in the plate. The openings in the plate and the coating rollers are arranged in a staggered array aligned angularly with respect to the direction of travel of the bottle. Each roller applies a band of coating material to the bottom of the bottle, and the angular difference between the alignment of the rollers and the direction of travel of the bottle results in overlapping and complete coverage of the bottom of the bottle with the coating material. The bottle is held between two rotating belts to move the bottle over the bottom coat rollers. After bottom coating, the bottle, still held by the belts, passes through a UV curing station where it is cured by UV radiating lamps directed at the bottom of the bottles.

After exiting from the bottom curing station, the bottle is deposited on a conveyor and then moves to the side wall coating station where the side wall is coated by rotating belts which engage the side wall. The bottle then moves to a side wall curing station where the side wall coating is cured, and the bottle is then delivered to a collection area.

BRIEF DESCRIPTION OF THE DRAWINGS

Referring now to the drawings, wherein like elements are numbered alike in the several FIGURES:

FIG. 2 is an enlarged top plan view of details of the bottom coating station.

FIG. 2A is an enlarged detail of the belt of FIG. 2.

FIG. 3 is an enlarged plan view of the assembly plate of the bottom coater.

FIG. 4 is an elevation view taken along line 4—4 of FIG. 3.

FIG. 5 is an enlarged top plan view of details of the side wall coating section.

FIG. 6 is a sectional elevation view along line 6—6 of FIG. 5.

FIG. 7 is a view similar to FIG. 6 showing an alternate embodiment.

DESCRIPTION OF THE PREFERRED EMBODIMENT

Figure 1:
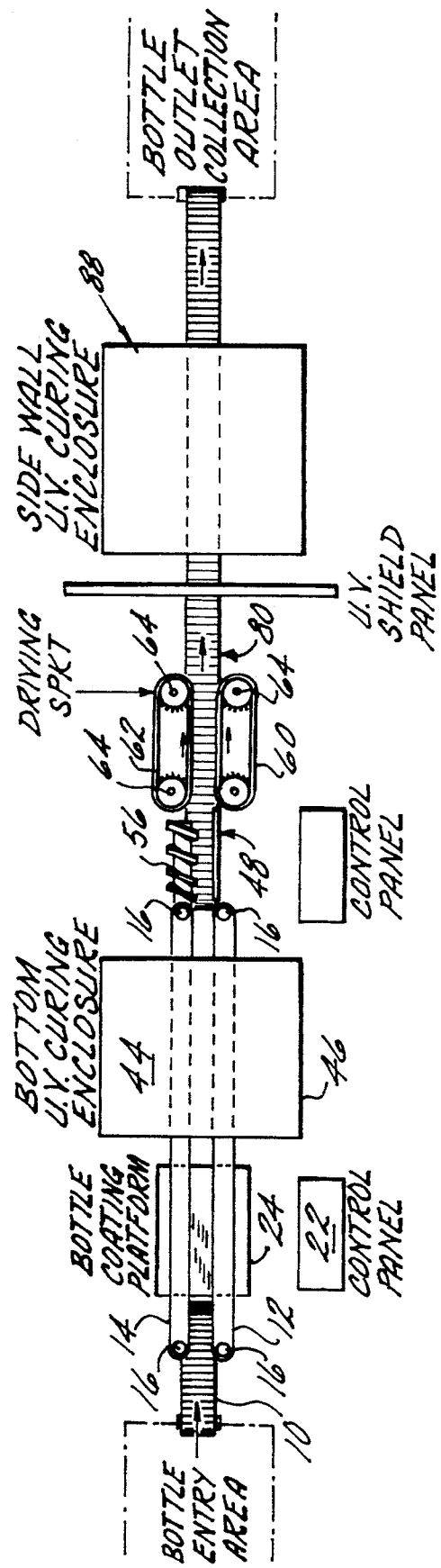
FIG. 1 is a schematic, in top plan view of the bottle coating apparatus of the present invention.

Referring to FIGS. 1 and 2, the bottles, which are coming from a lehr or from any convenient storage area, are delivered in single file to a horizontal conveyor section 10 made up of articulated segments, which may be plastic or metal, forming an endless conveyor belt. Conveyor section 10 delivers each bottle to a pair of vertically arranged endless belts 12 and 14. Each of the belts 12 and 14 has an inner layer of urethane and an outer layer of silicone, and the belts are driven in the direction indicated by the arrows in FIG. 2 to move the bottles from left to right. The belts are friction driven by drive rollers 16 at opposite end of each pair of belts 12, 14. Drive rollers 16 are supported by support plates 18 which are moveable toward and away from each other to adjust the spacing between the belts to accommodate for different bottle sizes. The adjusting is accomplished by mounting the support plates on horizontal screw rods (not shown) which can be rotated to adjust the spacing between bolts. The screw rods can be manually adjusted or can be controlled from control panel 22. Also, rollers 20 are supported from plates 18 and are spring loaded against the belts to urge belts 12 and 14 into firm gripping engagement with the bottles and to compensate for slight variations in size from bottle to bottle. The speeds of the belts can be individually varied at control panel 22 by changing the speeds of their respective dive rollers 16, whereby the bottles can be caused to rotate, if desired, as they are carried by belts 12, 14.

Each bottle is firmly gripped along opposed side portions by belts 12 and 14 and moved from left to right into the apparatus. Each bottle moves past the end of conveyor 10 and is carried over a bottom coater platform 24. Referring to FIGS. 3 and 4, details of the bottom coater are shown. Platform 24 is a horizontal plate with an array of staggered circular openings 26. The openings are staggered and arranged in a series of rows inclined at an angle with respect to the direction of travel of the bottles over the plate, the direction of travel being indicated by the arrows 28. A foam coated roller 30 is rotatably mounted in each circular opening 26. Each roller 30 is rotatably mounted on a shaft 32, the ends of which are held in opposed housings 34. The housings 34 are vertically adjustable by virtue of being mounted on springs 36, which, in turn are held by uprights 38 attached to a lower apparatus frame plate 40. Frame plate 40 also has an array of staggered openings at which the uprights 38 are attached to the plate 40, the array of openings in plate 40 being twice the number of the openings in plate 24 and running parallel to the desired inclined array of rollers 30. Thus, each roller is spring loaded vertically upward and is vertically adjustable in position to bear against and coat the bottom of each bottle and accommodate the differences in position and/or shape of bottle bottoms as the bottles pass over plate 24. While plate 24 is particularly useful in helping to maintain cleanliness in the system, it can be omitted. That, then, leaves frame plate 40 to support the uprights 38, springs 36, housings 34, shafts 32 and rollers 30.

Each roller 30 is coated with the strength enhancing coating material to be applied to the bottle bottom. Each roller is caused to rotate as it is contacted by the bottle passing over the roller, and the roller deposits a path or stripe of coating composition on the bottom of the bottle commensurate with the width of the roller. The angularity of the rows of rollers with respect to direction of travel of the bottle results in overlapping of successive stripes or paths of applied material to ensure that the entire bottom of the bottle is coated as the bottle passes from the beginning to the end of the array of rollers. Also, the width of the array of rollers is greater than the diameter of the bottle, so that factor, along with the foam surface of each roller, results in some coating material also being applied to the shoulder or heel of the bottle bottom where the bottom merges into the side wall of the bottle.

A top bar 42 is located over the top of the line of bottles passing between belts 12 and 14 to prevent any bottle form "walking" or "climbing" out of the system.

The elements described including conveyor 10, belts 12, 14, plate 24 and spring loaded rollers 30 constitutes a bottom coating station. As noted previously, the strength enhancing coating material to be applied to the bottle is a material such as disclosed in the Skutnik or Hashimoto et al patents. That material is applied in liquid form to roller 30, and it is transferred from rollers 30 to the bottom of the bottle. The foam coating on each roller 30 is a closed cell foam, preferably neoprene, which deposits a thin liquid coating of about 5 microns (±1.5 microns) on the bottle bottom. The liquid is supplied to each roller from a reservoir 31 and a knurled transfer roller 33. The knurled roller 33 is rotated to pick up a small amount of the liquid chemical and transfer the chemical from the reservoir to the roller 30.

If the coating material is to be applied in a two step process (the adhesive agent (e.g., silane) in a first step and the polymer-forming material in a second step), the bottom coating station can be divided into two sections (i.e., have two separate sets of rollers) aligned along the direction of travel of the bottles. The adhesive agent would be applied to the bottom of the bottles at the first set of rollers, and the polymer-forming material would be applied at the second set of rollers.

After the bottle bottom has been coated, the bottle, still firmly held by and between belts 12 and 14 is delivered to a bottom UV curing station 44, which includes an enclosure 46 with a plurality of UV lamps (not shown) at the bottom of the enclosure below the vertical level of the bottles passing through enclosure 46. Note that at this part of the apparatus there is no conveyor beneath the bottles, so the bottom of each bottle is exposed to the UV lamps at the bottom of enclosure 46, whereby the coating material on the bottom and bottom shoulder or heel is cured by UV irradiation.

After exiting the UV curing station 44, each bottle is delivered to and deposited on a conveyor segment 48 (see FIGS. 1 and 5) which includes a central section 50 of articulated segments and abutting chain segments 52, 54. The discharge end of belts 12, 14 may be slightly splayed to facilitate the delivery of the bottles to conveyor segment 48. The combined width of center segment 50 and chains 52, 54 is slightly greater than the diameter of the bottle. A worm separator 56 is located at the beginning of conveyor segment 48 to engage each bottle and to establish a uniform spacing between successive bottles at this point.

Each bottle is then passed along by the conveyor to a side wall coating section 58 which includes a pair of opposed belts 60, 62 (see FIGS. 5 and 6). Each belt 60, 62 is constructed of a closed cell foam material, preferably neoprene. The belts are driven in timed relationship by sprocket wheels 64, the sprockets of which engage with corresponding elements on the inner surface of the belts. Each sprocket is mounted on a support 66, and the spacing between the belts is adjustable by virtue of mounting the supports 66 on horizontal screw rods (not shown). Belts 60, 62 are driven at slightly different speeds. The speed of the belts, the spacing between the belts, and the speed of worm 56 may be controlled at control panel 68.

In the area between belts 60, 62, the conveyor is reduced to just center segment 50, the width of which is less than the diameter of the bottle to be coated. The outer surface of belts 60, 62 is coated with the strength enhancing material in liquid form to be applied to the side wall of the bottle. The chemical liquid to be coated on the side wall of the bottle is stored in a cylindrical reservoir 61 which includes a porous sintered metal outer casing 63 in contact with the belt and a plastic inner sleeve 65 with passages facing the belt to be coated. The liquid is under pressure in the center of sleeve 65, and the liquid is delivered to porous casing 63 and migrates through casing 63 in the vicinity of the belt to apply the liquid to the belt for transfer to the bottle side wall. Each belt may be supplied with a reservoir 61. The reservoir 61 extends along the full height of the belt.

Belts 60 and 62 extend vertically along the full height of the side wall of the bottle to be coated (see FIG. 6), and extend below the bottom of the bottle to ensure full coating of the bottle side wall from the neck to the bottom shoulder. Coating overlap may occur at the bottom shoulder or heel to the extent the shoulder was also coated at the bottom coating station, but that is acceptable; to miss the shoulder area would leave a weak site in the bottle. Parts of the belt may be contoured to match bottle contours. The spacing between belts 60, 62 is such that the belts firmly engage the bottle as it passes between the belts. The slight differential speed of the belts causes the bottle to be rotated by the belts and also to be lifted slightly above the surface of conveyor section 50. The rotation of the bottle by the belts ensures full coating of the entire circumference of the side wall surface with the strength enhancing material; and the lifting of the bottle off conveyor 50 prevents scratching of the bottom surface during side coatings. Scratching of the bottom is avoided because it removes coating previously applied to the bottom and also because scratching impairs the strength of the bottle at the site of the scratch.

A third belt 70 located above belt 62, constructed and driven like belts 60, 62 may be employed to coat the neck portion of the bottle. This third belt may be paired with a similar neck area belt above belt 60, or it may be paired with a contoured stationary backer consisting of a steel plate 72 and a closed cell foam layer 74, preferably neoprene, contoured to match the contour of the neck area of the bottle. The neck belt may also be supplied with chemical from a reservoir such as reservoir 61.

Instead of a pair of belts driven at differential speeds, the structure of FIG. 7 may be used, and is preferred. In this arrangement, the bottle is contacted by a single rotating belt and a stationary backer comprising a steel plate 78 and a closed cell foam layer 80, preferably neoprene, contoured to match the shape of the bottle. Either or both of the belt 76 and the foam 80 may be supplied with the liquid coating material. The movement of the belt will cause the bottle to rotate and be fully coated as it moves between the belt and the stationary backer. If the belt is supplied with the liquid chemical, that supply will be accomplished by a reservoir 61 in contact with the belt, as described above. The supply of liquid to the neck area could be effected by dripping a small amount of the chemical on the top of contoured foam layer 80. Alternately, if an open cell foam material is used, backer plate 78 can be a porous sintered metal layer forming one wall of a reservoir where liquid is stored under pressure. The liquid would migrate through the backer plate 78 to the foam layer 80 for transfer to the bottle.

Regardless of the supply mechanism used, a very thin coating of about 5 microns (±1.5 microns) is deposited on the bottle side wall and neck.

As with the bottom coater, if the coating material is to be applied to sides and necks of the bottles in a two step process (adhesive agent (e.g., silane) in a first step and polymerforming material in a second step), the side and neck coating stations of FIG. 5, 6 and/or 7 can be divided into two successive sections with the belts of FIGS. 5 and 6 being repeated at each section, or the belt and backer arrangement of FIG. 7 being repeated at each section. The adhesive agent (silane) would be applied to the sides and necks at the first section, and the polymerforming material would be applied at the second section.

After coating the side and neck portions of the bottle, the bottle exits from between belts 60, 62 and is redeposited on conveyor segment 82, which includes a continuation of center section 50 and side chain segments 84, 86. Side chain segments 84, 86 are driven at slightly different relative speeds, as are chain segments 52, 54. The effect of these differential chain speeds in conveyor segments 48 and 82 is to keep each bottle centered on the conveyor and prevent the bottles from "wandering".

Each bottle then moves on the conveyor 80 to side wall curing station 88, which includes an enclosure 90 with UV lamps arranged in opposite sides of the conveyor to cure the strength enhancing material on the side wall and neck of each bottle. The entrance to enclosure 90 may be shielded with a shield panel 92 having an opening to permit passage of the conveyor and bottles. After curing in the side wall curing station, the bottles are delivered to a bottle collection area, from which they may then be moved to storage for subsequent filling, or directly to a filling line.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A glass container coating apparatus including:

bottom coating means for applying a coating of material in liquid form to the bottom of a glass container;

bottom curing means for curing the coating applied to the bottom of the glass container, said bottom curing means being downstream of said bottom coating means in the direction of travel of a glass container through the coating apparatus side wall coating means for applying a coating of material in liquid form to the side wall of the glass container, said side wall coating means being downstream of said bottom curing means in the direction of travel of a glass container through the coating apparatus; and side wall curing means for curing the coating applied to the side wall of the glass container, said side wall curing means being downstream of said side wall coating means in the direction of travel of a glass container through the coating apparatus;

said bottom coating means including:
  a plate;
  a plurality of openings in said plate arranged in a staggered array forming a plurality of rows at an angle with respect to the direction of movement over said plate of a glass container to be coated;
  a coating roller in each of said openings; and
  means for bringing each of said rollers into contact with the bottom of a glass container passing over said plate.

2. The coating apparatus of claim 1 wherein:

said bottom coating means also includes a pair of opposed belts located over said plate to move a glass container over said plate and said rollers.

3. The coating apparatus of claim 1 wherein:

each of said coating rollers includes means to accommodate movement of each roller perpendicular to the bottom of the glass container to be coated.

4. The coating apparatus of claim 1 wherein:

each of said coating rollers includes means to accommodate movement of each roller in a vertical direction.

5. The coating apparatus of claim 1 wherein:

each of said coating rollers is spring loaded so as to be capable of movement relative to the bottom of a glass container to be coated.

6. The coating apparatus of claim 1 wherein:

said coating rollers are arranged in a plurality of rows angularly disposed with respect to the direction of travel of a glass container over said plate to coat the glass container bottom in overlapping stripes of liquid material.

7. The coating apparatus of claim 1 wherein:

said side wall coating means includes a pair of opposed coating belts moveable at a different speed with respect to the other.

8. The coating apparatus of claim 7, including:

spacer means located between said bottom curing means and said side wall coating means to establish a spacing between glass containers prior to entry of each glass container into said side wall coating means.

9. The coating apparatus of claim 8 wherein:

said spacer means is a worm.

10. The coating apparatus of claim 1 including:

conveyor means extending from a point upstream of said side wall coating means to a point downstream of said side wall curing means, said conveyor means having a section of reduced width at the location of and beneath said side wall coating means.

11. The coating apparatus of claim 1 wherein said coating rollers include:

a closed cell foam material.

12. The coating apparatus of claim 1 wherein said coating rollers include:

a closed cell neoprene foam material.

13. The coating apparatus of claim 1 wherein said side wall coating means includes:

at least one belt having a closed cell foam material.

14. The coating apparatus of claim 1 wherein said side wall coating means includes:

at least one belt having a closed cell neoprene foam material.

15. The coating apparatus of claim 1 wherein said side wall coating means includes:

at least one endless belt and at least one backer plate, said belt and said backer plate being separated by an amount to enable said belt and said backer plate to contact the side of a glass container to be coated therebetween.

16. A coating apparatus comprising means for applying a liquid coating to the bottom of a glass container, the apparatus including, a plate;

a plurality of openings in said plate arranged in a staggered array forming a plurality of rows at an angle with respect to the direction of movement over said plate of a glass container to be coated;

a coating roller in each of said openings; and means for bringing each of said rollers into contact with the bottom of a glass container passing over said plate.

17. The coating apparatus of claim 16 wherein:

said bottom coating means also includes a pair of opposed belts located over said plate to move a glass container over said plate and said rollers.

18. The coating apparatus of claim 16 wherein:

each of said coating rollers includes means to accommodate movement of each roller perpendicular to the bottom of the bottle to be coated.

19. The coating apparatus of claim 16 wherein:

each of said coating rollers includes means to accommodate movement of each roller in a vertical direction.

20. The coating apparatus of claim 16 wherein:

each of said coating rollers is spring loaded so as to be capable of movement relative to the bottom of a glass container to be coated.

21. The coating apparatus of claim 16 wherein:

said coating rollers are arranged in a plurality of rows angularly disposed with respect to the direction of a glass container over said plate to coat the glass container bottom in overlapping stripes of liquid material.

22. The coating apparatus of claim 16 wherein:

said coating rollers include a closed cell foam material.

23. The coating apparatus of claim 16 wherein:

said coating rollers include a closed cell neoprene foam material.

24. A glass container coating apparatus including:

bottom coating means for applying a coating of material in liquid form to the bottom of a glass container;

bottom curing means for curing the coating applied to the bottom of the glass container, said bottom curing means being downstream of said bottom coating means in the direction of travel of a glass container through the coating apparatus;

side wall coating means for applying a coating of material in liquid form to the side wall of the glass container, said side wall coating means being downstream of said bottom curing means in the direction of travel of a glass container through the coating apparatus; and side wall curing means for curing the coating applied to the side wall of the glass container, said side wall curing means being downstream of said side wall coating means in the direction of travel of a glass container through the coating apparatus;

said bottom coating means including:

a frame plate;

a plurality of openings in said plate arranged in a staggered array forming a plurality of rows at an angle with respect to the direction of travel over said plate of a glass container to be coated;

a plurality of coating rollers supported at said openings and over said plate to form an array of rollers arranged in a staggered array with respect to the direction of travel of a glass container to be coated, said rollers being adapted to contact the bottom of a glass container passing over said rollers.

25. The coating apparatus of claim 24 wherein:

said bottom coating means also includes a pair of opposed belts located above said rollers to move a glass container over said rollers.

26. The coating apparatus of claim 24 wherein:

each of said coating rollers includes means to accommodate movement of each roller perpendicular to the bottom of the bottle to be coated.

27. The coating apparatus of claim 24 wherein:

each of said coating rollers includes means to accommodate movement of each roller in a vertical direction.

28. The coating apparatus of claim 24 wherein:

each of said coating rollers is spring loaded so as to be capable of movement relative to the bottom of a glass container to be coated.

29. The coating apparatus of claim 24 wherein:

said coating rollers are arranged in a plurality of rows angularly disposed with respect to the direction of travel of a glass container over said plate to coat the glass container bottom in overlapping stripes of liquid material.

30. The coating apparatus of claim 24 wherein:

said side wall coating means includes at least a first pair of opposed coating belts, each of said belts being moveable at a different speed with respect to the other.

31. The coating apparatus of claim 30 including:

spacer means located between said bottom curing means and said side wall coating means to establish a spacing between glass containers prior to entry of each glass container into said side wall coating means.

32. The coating apparatus of claim 31 wherein:

said spacer means is a worm.

33. The coating apparatus of claim 24 including:

conveyor means extending from a point upstream of said side wall coating means to a point downstream of said side wall curing means, said conveyor means having a section of reduced width at the location of and beneath said side wall coating means.

34. The coating apparatus of claim 24 wherein said coating rollers include:

a closed cell foam material.

35. The coating apparatus of claim 24 wherein said coating rollers include:

a closed cell neoprene foam material.

36. The coating apparatus of claim 24 wherein said side wall coating means includes:

at least one belt having a closed cell foam material.

37. The coating apparatus of claim 24 wherein said side wall coating means includes:

at least one belt having a closed cell neoprene foam material.

38. The coating apparatus of claim 24 wherein said bottom coating means includes:

a first station for applying a first coating of material to the bottom of a bottle; and a second station downstream of said first station for applying a second coating of material to the bottom of a bottle;

each of said first and second stations including:

a frame plate;

a plurality of openings in said plate arranged in a staggered array forming a plurality of rows at an angle with respect to the direction of travel over said plate of a glass container to be coated;

a plurality of coating rollers supported at said openings and over said plate to form an array of rollers arranged in a staggered array with respect to the direction of travel of a glass container to be coated, said rollers being adapted to contact the bottom of a glass container passing over said rollers.

39. The coating apparatus of claim 24 wherein said side wall coating means includes:

a first station for applying a first coating of material to the bottom of a bottle; and a second station for applying a second coating to the bottom of a bottle.

40. The coating apparatus of claim 39 wherein each of said first and second stations includes:

a pair of opposed endless coating belts moveable at a different speed with respect to each other.

41. The coating apparatus of claim 39 wherein each of said first and second includes:

an endless belt and a backer plate, said belt and said backer plate being separated by an amount to enable said belt and backer plate to contact the side of glass container to be coated therebetween.

42. A coating apparatus comprising means for applying a liquid coating to the bottom of a glass container, the apparatus including, a frame plate;

a plurality of openings in said plate arranged in a staggered array forming a plurality of rows at an angle with respect to the direction of movement over said plate of a glass container to be coated;

a plurality of coating rollers supported at said openings and over said plate to form an array of rollers in a staggered array with respect to the direction of travel of a glass container to be coated; and means for bringing each of said rollers into contact with the bottom of a glass container passing over said rollers.

43. The coating apparatus of claim 42 wherein:

said bottom coating means also includes a pair of opposed belts located above said plate to move a glass container over said plate and said rollers.

44. The coating apparatus of claim 42 wherein:

each of said coating rollers includes means to accommodate movement of each roller perpendicular to the bottom of the glass container to be coated.

45. The coating apparatus of claim 42 wherein:

each of said coating rollers includes means to accommodate movement of each roller in a vertical direction.

46. The coating apparatus of claim 42 wherein:

each of said coating rollers is spring loaded so as to be capable of movement relative to the bottom of a glass container to be coated.

47. The coating apparatus of claim 42 wherein:

said coating rollers are arranged in a plurality of rows angularly disposed with respect to the direction of travel of a glass container over said plate to coat the glass container bottom in overlapping stripes of liquid material.

48. A glass container coating apparatus including:

bottom coating means for applying a coating of material in liquid form to the bottom of a glass container;

bottom curing means for curing the coating applied to the bottom of the glass container said bottom curing means being downstream of said bottom coating means in the direction of travel of a glass container through the coating apparatus;

side wall coating means for applying a coating of material in liquid form to the side wall of the glass container said side wall coating means being downstream of said bottom curing means in the direction of travel of a glass container through the coating apparatus; and side wall curing means for curing the coating applied to the side wall of the glass container said side wall curing means being downstream of said side wall coating means in the direction of travel of a glass container through the coating apparatus;

said bottom coating means including:

a frame plate;

a plurality of coating rollers mounted on said plate and arranged in an array forming a plurality of rows at an angle with respect to the direction of travel above said plate of a glass container to be coated; and means for bringing said rollers into contact with the bottom of a glass container passing over said rollers.

49. The coating apparatus of claim 48 wherein:

said bottom coating means also includes a pair of opposed belts located above said rollers to move a glass container over said rollers.

50. The coating apparatus of claim 48 wherein:

each of said coating rollers includes means to accommodate movement of each roller perpendicular to the bottom of a glass container to be coated.

51. The coating apparatus of claim 48 wherein:

each of said coating rollers includes means to accommodate movement of each roller in a vertical direction.

52. The coating apparatus of claim 48 wherein:

each of said coating rollers is spring loaded so as to be capable of movement relative to the bottom of a glass container to be coated.

53. The coating apparatus of claim 48 wherein:

said coating rollers are arranged in a plurality of rows angularly disposed with respect to the direction of travel of a glass container above said plate to coat the glass container bottom in overlapping stripes of liquid material.

54. The coating apparatus of claim 48 wherein:

said side wall coating means includes at least a first pair of opposed coating belts each of said belts moveable at a different speed with respect to the other.

55. The coating apparatus of claim 54 including:

spacer means located between said bottom curing means and said side wall coating means to establish a spacing between glass containers prior to entry of each glass container into said side wall coating means.

56. The coating apparatus of claim 55 wherein:

said spacer means is a worm.

57. The coating apparatus of claim 48 including:

conveyor means extending from a point upstream of said side wall coating means to a point downstream of said side wall curing means, said conveyor means having a section of reduced width at the location of and beneath said side wall coating means.

58. The coating apparatus of claim 48 wherein said coating rollers include:

a closed cell foam material.

59. The coating apparatus of claim 48 wherein said coating rollers include:

a closed cell neoprene foam material.

60. The coating apparatus of claim 48 wherein said side wall coating means includes:

at least one belt having a closed cell foam material.

61. The coating apparatus of claim 48 wherein said side wall coating means includes:

at least one belt having a closed cell neoprene foam material.

62. The coating apparatus of claim 48 wherein said bottom coating means includes:

a first station for applying a first coating of material to the bottom of a bottle; and a second station for applying a second coating of material to the bottom of a bottle;

each of said first and second stations including:

a frame plate;

a plurality of coating rollers mounted on said plate and arranged in an array forming a plurality of rows at an angle with respect to the direction of travel over said plate of a glass container to be coated; and means for bringing said rollers into contact with the bottom of a glass container passing over said rollers.

63. The coating apparatus of claim 48 wherein said side wall coating means includes:

a first station for applying a first coating of material to the side wall of a glass container; and a second station for applying a second coating to the side wall of a glass container.

64. The coating apparatus of claim 63 wherein each of said first and second stations includes:

a pair of opposed endless coating belts moveable at a different speed with respect to each other.

65. The coating apparatus of claim 63 wherein each of said first and second stations includes:

an endless belt and a backer plate, said belt and said backer plate being separated by an amount to enable said belt and backer plate to contact the side of a glass container to be coated therebetween.

66. A coating apparatus comprising means for applying a liquid coating to the bottom of a glass container, the apparatus including, a frame plate;

a plurality of coating rollers mounted on said plate and arranged in an array forming a plurality of rows at an angle with respect to the direction of movement above said plate of a glass container to be coated; and means for urging said rollers into contact with the bottom of a glass container passing over said rollers.

67. The coating apparatus of claim 66 wherein:

said bottom coating means also includes a pair of opposed belts located above said plate to move a glass container over said plate and said rollers.

68. The coating apparatus of claim 66 wherein:

each of said coating rollers includes means to accommodate movement of each roller perpendicular to the bottom of a glass container to be coated.

69. The coating apparatus of claim 66 wherein:

each of said coating rollers includes means to accommodate movement of each roller in a vertical direction.

70. The coating apparatus of claim 66 wherein:

each of said coating rollers is spring loaded so as to be capable of movement relative to the bottom of a glass container to be coated.

71. The coating apparatus of claim 66 wherein:

said coating rollers are arranged in a plurality of rows angularly disposed with respect to the direction of a glass container above said plate to coat the bottle bottom in overlapping stripes of liquid material.

* * * * *